United States Patent
Wang

(10) Patent No.: US 10,936,876 B2
(45) Date of Patent: Mar. 2, 2021

(54) CONTENT RECOGNITION METHOD, SYSTEM AND STORAGE MEDIUM THEREOF

(71) Applicant: Tencent Technology (Shenzhen) Company Limited, Shenzhen (CN)

(72) Inventor: Dafeng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 97 days.

(21) Appl. No.: 16/526,561

(22) Filed: Jul. 30, 2019

(65) Prior Publication Data

US 2019/0354768 A1    Nov. 21, 2019

Related U.S. Application Data

(63) Continuation of application No. PCT/CN2018/075379, filed on Feb. 6, 2018.

(30) Foreign Application Priority Data

Feb. 15, 2017   (CN) .......................... 201710081274.1

(51) Int. Cl.
   *G06K 9/00*   (2006.01)
   *G06K 9/20*   (2006.01)
(52) U.S. Cl.
   CPC ....... *G06K 9/00744* (2013.01); *G06K 9/2054* (2013.01); *G06K 2009/00738* (2013.01)
(58) Field of Classification Search
   CPC ..... G06K 9/00711; G06K 2009/00738; G06K 9/00744; G06K 9/2054; G06K 9/3233;
   (Continued)

(56) References Cited

U.S. PATENT DOCUMENTS 9,756,265 B2    9/2017  Kuboyama
2009/0297023 A1   12/2009  Lipton et al.
(Continued)

FOREIGN PATENT DOCUMENTS

CN    1722825 A    1/2006
CN   101729867 A    6/2010
(Continued)

OTHER PUBLICATIONS

Supplementary European Search Report for EP Application No. 18 75 4005 dated Nov. 12, 2020 (9 pages).
(Continued)

*Primary Examiner* — Andrew W Johns
(74) *Attorney, Agent, or Firm* — Brinks Gilson & Lione

(57) ABSTRACT

A system may obtain a first recognition record file. The first recognition record file may include recognition records. The recognition records may include respective coordinates for a monitored video received by a monitoring device. The respective coordinates may be indicative of a specified event previously recognized based on the monitored video. The system may determine a monitoring boundary based on the respective coordinates of the recognition records for the monitored video received by the monitoring device. The system may receive at least one frame of subsequent monitored video. The system may extract in response to receipt of the at least one frame of the subsequent monitored video, image data from the at least one frame of the subsequent monitored video. The extracted image data from the at least one frame may be located in the monitoring boundary as applied to the at least one frame of the subsequent monitored video.

20 Claims, 5 Drawing Sheets

(58) Field of Classification Search
CPC .. G06T 7/11; G06T 7/215; G06T 2207/30232
See application file for complete search history.

(56) References Cited

U.S. PATENT DOCUMENTS

| | | | |
|---|---|---|---|
| 2012/0288198 | A1 | 11/2012 | Togo et al. |
| 2015/0092057 | A1 | 4/2015 | Lee |
| 2015/0199032 | A1 | 7/2015 | Lee et al. |
| 2015/0222859 | A1 | 8/2015 | Schweid et al. |
| 2018/0157915 | A1* | 6/2018 | Sherry ................ H04N 21/84 |

FOREIGN PATENT DOCUMENTS

| | | |
|---|---|---|
| CN | 103200357 A | 7/2013 |
| CN | 103327306 A | 9/2013 |
| CN | 103646257 A | 3/2014 |
| CN | 103686074 A | 3/2014 |
| CN | 104021570 A | 9/2014 |
| CN | 104754302 A | 7/2015 |
| CN | 105320366 A | 2/2016 |
| JP | 2014036414 A | 2/2014 |
| JP | 2016181174 A | 10/2016 |
| WO | WO 2016/025485 A2 | 2/2016 |

OTHER PUBLICATIONS

International Search Report with English translation and Written Opinion of International Searching Authority, issued in International Application No. PCT/CN2018/075379, dated May 3, 2018, pp. 1-9, State Intellectual Property Office of the P.R. China, Beijing, China.

Chinese Office Action with English translation, issued in CN Patent Application No. 2017100812741, dated May 28, 2019, pp. 1-7, State Intellectual Property Office of the P.R. China, Beijing, China.

* cited by examiner

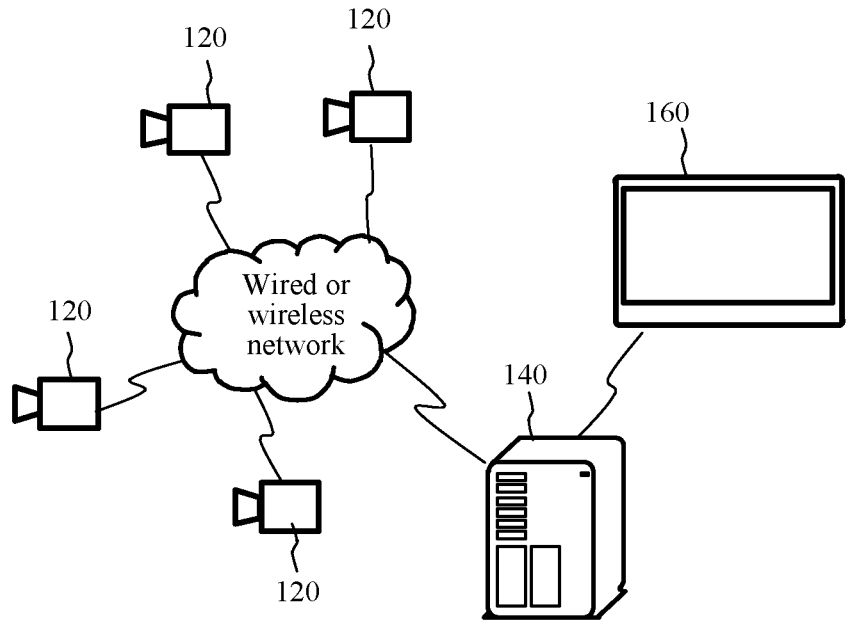

FIG. 1

| 201 | Obtain a first recognition record file, the first recognition record file including at least two recognition records, each recognition record including a corresponding coordinate of a specified event in a monitored image photographed by a monitoring device, and the specified event being recognized from the monitored image |

| 202 | Determine a monitored region according to the coordinates included in the at least two recognition records in the first recognition record file |

| 203 | Recognize, when recognizing at least one frame of monitored image subsequently photographed by the monitoring device, an image corresponding to the monitored region in the at least one frame of monitored image |

| 204 | For each of the at least one frame of monitored image, calculate an event probability that an event recognized from the monitored image is the specified event |

| 205 | Generate a recognition record of the event according to a corresponding coordinate of the event in the monitored image when the event probability is higher than a preset probability threshold, and add the recognition record of the event to the first recognition record file |

CONTENT RECOGNITION METHOD, SYSTEM AND STORAGE MEDIUM THEREOF

CROSS REFERENCE TO RELATED APPLICATIONS

This application is a continuation of International Application PCT/CN2018/075379, filed Feb. 6, 2018, entitled IMAGE IDENTIFICATION METHOD, DEVICE, APPARATUS, AND DATA STORAGE MEDIUM, which claims priority to Chinese Patent Application No. 201710081274.1, filed on Feb. 15, 2017, both of which are incorporated herein by reference in their entireties.

TECHNICAL FIELD

This application relates to the field of video monitoring technologies, and in particular, to an image and content recognition.

BACKGROUND

With the continuous development of video monitoring technologies, an increasing quantity of monitoring devices, for example, cameras, are mounted in public places. Manual recognition of video content is prone to errors and inefficiencies. Existing image and video recognition systems devote a substantial footprint of computer resources to perform computation-intensive operations.

SUMMARY

The system and methods described here may include system and methods of selective image recognition. By way of example, various operations of a content recognition method described herein may include obtaining, by a recognition device, a first recognition record file. The first recognition record file may include a plurality of recognition records. The recognition records may include respective coordinates for a monitored video received by a monitoring device. The respective coordinates may be indicative of a specified event previously recognized based on the monitored video. The content recognition method may further include determining, by the recognition device, a monitoring boundary based on the respective coordinates of the recognition records for the monitored video received by the monitoring device. The content recognition method may further include receiving, by the recognition device, at least one frame of subsequent monitored video. The content recognition method may further include extracting, by the recognition device, in response to receipt of the at least one frame of the subsequent monitored video, image data from the at least one frame of the subsequent monitored video. The image data from the at least one frame may be located in the monitoring boundary as applied to the at least one frame of the subsequent monitored video.

In additional or alternative examples, a content recognition system may include a processor. The processor may obtain a first recognition record file. The first recognition record file may include a plurality of recognition records. The recognition records may include respective coordinates for a monitored video received by a monitoring device. The respective coordinates may be indicative of a specified event previously recognized based on the monitored video. The processor may determine a monitoring boundary based on the respective coordinates of the recognition records for the monitored video received by the monitoring device. The processor may receive at least one frame of subsequent monitored video. The processor may extract in response to receipt of the at least one frame of the subsequent monitored video, image data from the at least one frame of the subsequent monitored video. The extracted image data from the at least one frame may be located in the monitoring boundary as applied to the at least one frame of the subsequent monitored video.

In additional or alternative examples, a non-transitory storage medium may include a plurality of instructions, the instructions executable by a processor to obtain a first recognition record file. The first recognition record file may include a plurality of recognition records. The recognition records may include respective coordinates for a monitored video received by a monitoring device. The respective coordinates may be indicative of a specified event previously recognized based on the monitored video. The instructions may be further executable by the processor to determine a monitoring boundary based on the respective coordinates of the recognition records for the monitored video received by the monitoring device. The instructions may be further executable by the processor to receive at least one frame of subsequent monitored video. The instructions may be further executable by the processor to extract in response to receipt of the at least one frame of the subsequent monitored video, image data from the at least one frame of the subsequent monitored video. The extracted image data from the at least one frame may be located in the monitoring boundary as applied to the at least one frame of the subsequent monitored video.

Additional and alternative examples and technical advantages are described below.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 1 is a schematic structural diagram of a monitoring system according to an embodiment of this application;

FIG. 2 is a flowchart of an image recognition method according to an exemplary embodiment;

DETAILED DESCRIPTION

Figure 3:
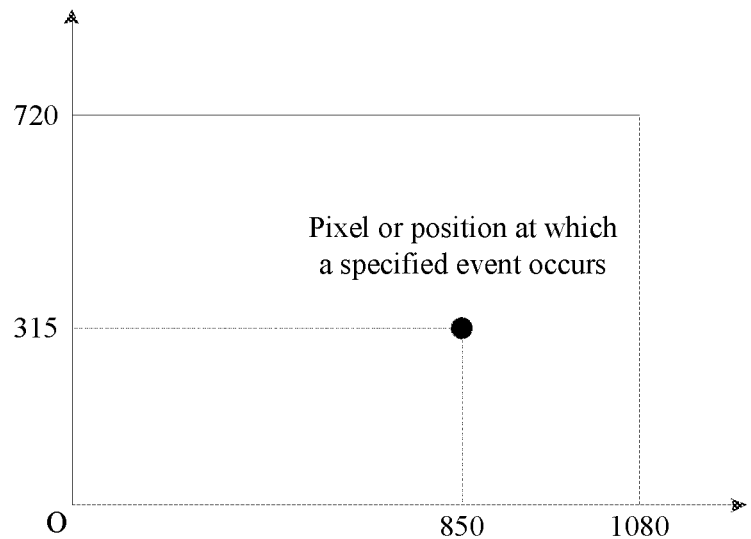
FIG. 3 is a schematic diagram of a coordinate used in the embodiment of FIG. 2.

Image and content recognition may involve automatically recognizing content in image data obtained by a monitoring device. For example, a monitoring system, such as an image recognition system, may recognize, frame by frame according to a pre-determined recognition algorithm, regions in a monitored video received by a monitoring device to recognize a specified event in the monitored video in time, for example, recognize an event that is related to a person or an object and that meets a specified requirement, or recognize an event in which a specified behavior appears.

Present approaches to content recognition may involve allocating large amounts of computer resources to processing large regions of image or video streams, such as the visible regions that change frame by frame. Computer resources allocated for this purpose consume large amounts of power, are expensive, and are unable to perform other tasks.

The technical advancements over existing approaches to image and content processing are made evident in the system and methods described herein.

FIG. 1 is a schematic structural diagram of a monitoring system according to an embodiment of this application. The system includes several monitoring devices 120 and a recognition device 140.

The monitoring device 120 may be a dedicated monitoring camera, or another electronic device (for example, a smartphone or a tablet computer) that includes a camera. The recognition device 140 may be a general-purpose computer or a server.

The monitoring device 120 and the recognition device 140 are connected by using a wired or wireless network. The monitoring device 120 may send a recorded monitored video to the recognition device 140 in real time by using the wired or wireless network, and the recognition device 140 recognizes, according to a pre-determined recognition algorithm, the monitored video recorded by the monitoring device 120.

The system may further include a graphic display device 160 connected to the recognition device 140. For example, the graphic display device 160 may be a display. When recognizing a monitored video, the recognition device 140 may aggregate and display the monitored video and a recognition result of the monitored video on the graphic display device 160.

In another possible implementation, the monitoring device 120 and the recognition device 140 may alternatively be different components of the same electronic device. For example, the monitoring device 120 may be a camera in the electronic device, the recognition device 140 may be a computer resources and circuitry (including a processor, a memory, and the like) in the electronic device, and the monitoring device 120 and the recognition device 140 are connected by using a communications bus in the electronic device.

In the solution in this embodiment of this application, in a process of recognizing a monitored video recorded by a monitoring device 120, the recognition device 140 may first obtain a first recognition record file of the monitoring device, the first recognition record file including at least two recognition records, each recognition record including a corresponding coordinate of a specified event in the monitored video recorded by the monitoring device 120, and the specified event being recognized from the monitored video; the recognition device 140 determines a monitored region according to the coordinates included in the at least two recognition records in the first recognition record file, the monitored region being a part of region of the monitored video recorded by the monitoring device; and the recognition device 140 recognizes, when recognizing at least one frame of monitored video subsequently recorded by the monitoring device, an image corresponding to the monitored region in the at least one frame of monitored video. The monitored video may include image data that changes or visually moves over a time period. For example, the monitored video may include a video stream or a set of stored video information such as, for example, a video file. A frame may include a portion of the video. For example, the frame may include image data of the video at a particular time within a particular time range.

In the solution in this embodiment of this application, the recognition device 140 may analyze the coordinate of the recognized specified event included in the recognition record of the monitored video recorded by the monitoring device 120, to determine the monitored region that needs to be subsequently recognized, so that only the determined monitored region needs to be recognized during recognition of a monitored video subsequently recorded by the monitoring device 120. For example, the recognition device 140 analyzes, at a time node, recognition records of a monitored video recorded by the monitoring device 120 before the time node, and determines a part of region in which the specified event recognized from the recognition records is relatively centralized in the monitored video as the monitored region. After the time node, when recognizing the specified event in a new monitored video recorded by the monitoring device 120, the recognition device 140 recognizes only the monitored region in the new monitored video, and does not recognize images of other regions than the monitored region in the new monitored video. Compared with the solution in which an entire monitored video is recognized, when the same recognition algorithm is used, the solution in this embodiment of this application can reduce a to-be-recognized image area, and reduce a calculation amount of the image recognition, thereby lowering a hardware requirement on a monitoring system and reducing power consumption.

FIG. 2 is a flowchart of an image recognition method according to an exemplary embodiment. The method may be applied to the recognition device 140 in the monitoring system shown in FIG. 1. The image recognition method may include the following steps:

Step 201: Obtain a first recognition record file, the first recognition record file including at least two recognition records, each recognition record including a corresponding coordinate of a specified event in a monitored video recorded by a monitoring device, and the specified event being recognized from the monitored video.

The first recognition record file is a file that includes at least two recognition records. Each recognition record includes one or more coordinates. The coordinate may be a coordinate of a specified event in a corresponding monitored video, the specified event being recognized by the recognition device from the monitored video corresponding to the recognition record.

The specified event may be that a specified person or object appears in the monitored video. For example, assuming that the recognition device needs to recognize a person in black or a black vehicle in the monitoring device, the specified event may be that a person in black or a black vehicle appears in the monitored video; or assuming that the recognition device needs to recognize a traffic accident, the specified event may be a traffic accident event.

In this embodiment of this application, one specified event recognized by the recognition device may correspond to only one coordinate. For example, the coordinate corresponding to the specified event may be a center coordinate of a region in which the specified event occurs in the monitored video. Specifically, when the specified event is a traffic accident event, the coordinate corresponding to the specified event may be a center coordinate of a region in which the traffic accident occurs. Alternatively, the coordinate corresponding to the specified event may be a coordinate of a particular position of an object related to the specified event. For example, when the specified event is that a person appears, the coordinate corresponding to the specified event may be a coordinate of a center of the head of the person.

In another possible implementation, one specified event may alternatively correspond to a plurality of coordinates. For example, the coordinates corresponding to the specified event may be coordinates of a plurality of particular positions of an object related to the specified event. For example, when the specified event is that a person appears, the coordinates corresponding to the specified event may be a coordinate of a center of the head of the person and a coordinate of a center of the body of the person.

The foregoing coordinate may be a pixel coordinate corresponding to a resolution of the monitored video, or may be a size coordinate corresponding to a size of the monitored video.

For example, FIG. 3 is a schematic diagram of a coordinate according to this embodiment of this application. As shown in FIG. 3, if a resolution of a monitored video recorded by the monitoring device is 1080*720, a coordinate system is set by using a lower left corner of the monitored video as an origin, a lower edge of the monitored video as a lateral axis, and a left edge as a longitudinal axis. Assuming that a pixel at which a specified event occurs in a frame of monitored video recorded by the monitoring device is the $850^{th}$ pixel starting from the left, and the $315^{th}$ pixel starting from the lower edge of the monitored video, the coordinate of the specified event may be set to (850, 315).

Alternatively, in FIG. 3, if a size of a monitored video recorded by the monitoring device is 1080 mm*720 mm, a coordinate system is set by using a lower left corner of the monitored video as an origin, a lower boundary of the monitored video as a lateral axis, and a left boundary as a longitudinal axis. Assuming that a position at which a specified event occurs in a frame of monitored video recorded by the monitoring device has a distance of 850 mm to the left boundary of the monitored video, and has a distance of 315 mm to the left boundary of the monitored video, the coordinate of the specified event may be set to (850, 315).

Step 202: Determine a monitored region according to the coordinates included in the at least two recognition records in the first recognition record file.

The monitored region may be include a boundary for the monitored video recorded by the monitoring device. The monitored region may include one or more coordinates that define the boundary. The boundary, as applied to a frame of a video, may define or specify a portion of the frame. The boundary, as applied to the video, may define multiple corresponding portions of frames as the frames change with video playback. In this embodiment of this application, the recognition device may determine, according to a historical monitoring record of the monitored video recorded by the monitoring device, a region in which the coordinate corresponding to the recognized specified event is relatively centralized in the monitored video as the monitored region.

The recognition device may determine a target coordinate in the coordinates included in the at least two recognition records in the first recognition record file, the target coordinate being a coordinate whose confidence level is higher than a preset confidence level threshold, and the confidence level being used for indicating a probability of recognizing the specified event again at the corresponding coordinate; and determine a smallest region including the target coordinate as the monitored region.

The target coordinate whose confidence level is higher than the preset confidence level threshold may be determined by using a probabilistic method. Specifically, for example, when determining the target coordinate, the recognition device may calculate a standard deviation of the coordinates included in the at least two recognition records in the first recognition record file; generate, according to the standard deviation, a two-dimensional normal distribution formula (the two-dimensional normal distribution formula being correspondingly an axisymmetrical bell-type curved surface in a space coordinate system) corresponding to the coordinates included in the at least two recognition records in the first recognition record file; and determine a coordinate, whose confidence level is higher than the confidence level threshold, in the coordinates included in the at least two recognition records in the first recognition record file, as the target coordinate according to the two-dimensional normal distribution formula and the confidence level threshold.

Optionally, when determining the smallest region including the coordinate whose confidence level is higher than the confidence level threshold as the monitored region, the recognition device may determine a region formed by outermost coordinates of target coordinates as the monitored region.

Figure 4:
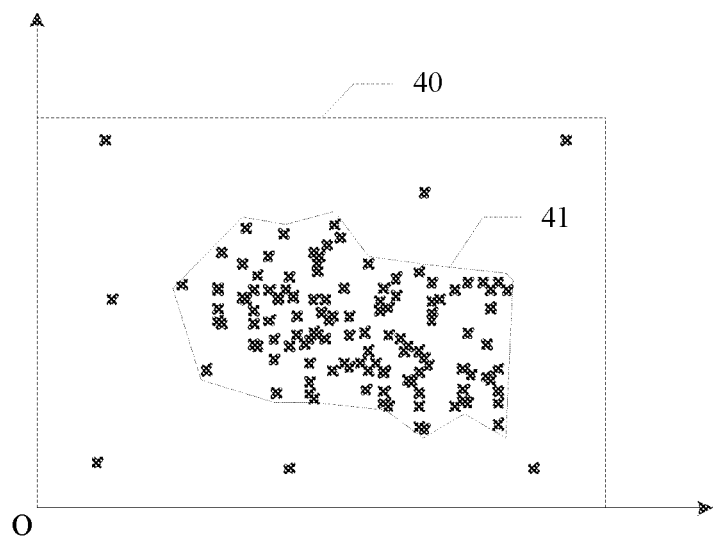
FIG. 4 is a schematic diagram of a monitored region used in the embodiment of FIG. 2.

For example, FIG. 4 is a schematic diagram of a monitored region according to this embodiment of this application. As shown in FIG. 4, a region 40 is a complete coordinate region of the monitored video. In FIG. 4, a coordinate of each "x"-shape mark is a coordinate included in the recognition records in the first recognition record file. The recognition device determines, by using a probabilistic method, that coordinates centralized in the middle part of the region 40 in FIG. 4 are coordinates whose confidence levels are higher than the preset confidence level threshold, and determines a region (that is, a region 41 in FIG. 4) formed by outermost coordinates of the coordinates whose confidence levels are higher than the preset confidence level threshold. The coordinate region corresponding to the region 41 is the determined monitored region.

Step 203: Recognize, when recognizing at least one frame of monitored video subsequently recorded by the monitoring device, an image corresponding to the monitored region in the at least one frame of monitored video.

After determining the monitored region and subsequently obtaining the at least one frame of monitored video recorded by the monitoring device, the monitoring device needs to recognize only a part of image data corresponding to the monitored region in the at least one frame of monitored video according to a pre-determined recognition algorithm, to determine whether the specified event occurs in the part of image corresponding to the monitored region.

According to the solution shown in step 201 to step 203 in this embodiment of this application, assuming that an area of a frame of monitored video recorded by the monitoring device is 100*100, the recognition device analyzes, at a time node, a recognition record of a monitored video recorded by the monitoring device before the time node, and determines a part of region that is in the monitored video and in which the specified event recognized from the recognition record is relatively centralized, as the monitored region (assuming that the monitored region is a region whose area is 50*50 in the monitored video). After the time node, when recognizing the specified event in a new monitored video recorded by the monitoring device, the recognition device 140 recognizes only the monitored region whose area is 50*50 in the new monitored video, and does not recognize images of other regions than the monitored region in the new monitored video. Compared with the solution in the related art in which all regions in an entire monitored video are recognized, in the solution in this embodiment of this application, only a part of region of an entire image needs to be recognized, so that problems of a relatively large calculation amount for recognizing a monitored video, a relatively high hardware requirement and relatively large power consumption in the related art can be resolved, and a calculation amount of the image recognition can be reduced, thereby lowering a hardware requirement on a monitoring system and reducing power consumption.

Optionally, when recognizing a part of the subsequent monitored video according to the determined monitored region, the recognition device may further supplement the first recognition record file. Correspondingly, this embodiment of this application may further include the following steps 204 and 205.

Step 204: For each of the at least one frame of monitored video, calculate an event probability that an event recognized from the monitored video is the specified event.

When recognizing the part of image corresponding to the monitored region in the monitored video according to the pre-determined recognition algorithm, the monitoring device may calculate an event probability that a recognized event is the specified event.

Specifically, for example, assuming that the specified event is an event that a person wearing a white hunting cap, a leather jacket, a pair of black pants, and black leather shoes appears, the monitoring device may compare a clothes feature of each person appearing in the currently recognized monitored video with the clothes feature of the person in the specified event, to calculate a similarity level between the clothes feature of each person and the clothes feature of the person in the specified event. The similarity level between the clothes feature of each person and the clothes feature of the person in the specified event may be used as the foregoing event probability. Alternatively, the foregoing event probability may be obtained according to the similarity level between the clothes features. For example, the recognition device may multiply the foregoing similarity level by a pre-determined coefficient (where the pre-determined coefficient may be a positive number close to and less than 1, for example, 0.9), and use an obtained value as the foregoing event probability. Alternatively, the recognition device may store a correspondence between an interval in which the similarity level exists and the event probability. The recognition device can determine the interval in which the similarity level exits after obtaining the similarity level through calculation, and further query for an event probability corresponding to the interval in which the similarity level exits.

Step 205: Generate a recognition record of the event according to a corresponding coordinate of the event in the monitored video when the event probability is higher than a preset probability threshold, and add the recognition record of the event to the first recognition record file.

The foregoing probability threshold may be a percentage set according to an actual application requirement. When the event probability calculated by the recognition device in step 204 is higher than the probability threshold (for example, 95%), it may be considered that the foregoing recognized event is the specified event. In this case, the recognition device may obtain a corresponding coordinate of the foregoing recognized event in the currently recognized monitored video, generate a recognition record including the coordinate, and add the generated recognition record to the first recognition record file, to supplement the first recognition record file in time. In this way, when subsequently determining a new monitored region, the recognition device may modify the original monitored region according to the added recognition record, thereby improving accuracy of the determined monitored region.

During actual application, after the recognition device is initially mounted, when the recognition device receives, for the first time, a monitored video recorded by the monitoring device, there is no recognition record in the first recognition record file. In this case, the recognition device may recognize all regions in the monitored video recorded by the monitoring device, or may recognize the monitored video recorded by the monitoring device according to a preset monitored region (where the preset monitored region may be a default region in the monitored video, or may be a region framed by a user or monitoring personnel), and generate a recognition record after recognizing the specified event and add the recognition record to the first recognition record file. Then, the recognition device may obtain the first recognition record file every pre-determined time period (for example, one day or one week), and determine a monitored region according to the obtained first recognition record file. Every time the monitored region is determined, the recognition device recognizes, based on the determined monitored region, an event in a monitored video subsequently recorded by the monitoring device, generates a recognition record when recognizing the specified event and adds the recognition record to the first recognition record file, until the first recognition record file is obtained next time and a new monitored region is determined. Alternatively, the recognition device may obtain the first recognition record file and determine a monitored region every time before recognizing a monitored video recorded by the monitoring device, recognize an event in the to-be-recognized monitored video based on the determined monitored region, generate a recognition record when recognizing the specified event, and add the recognition record to the first recognition record file.

Figure 5:
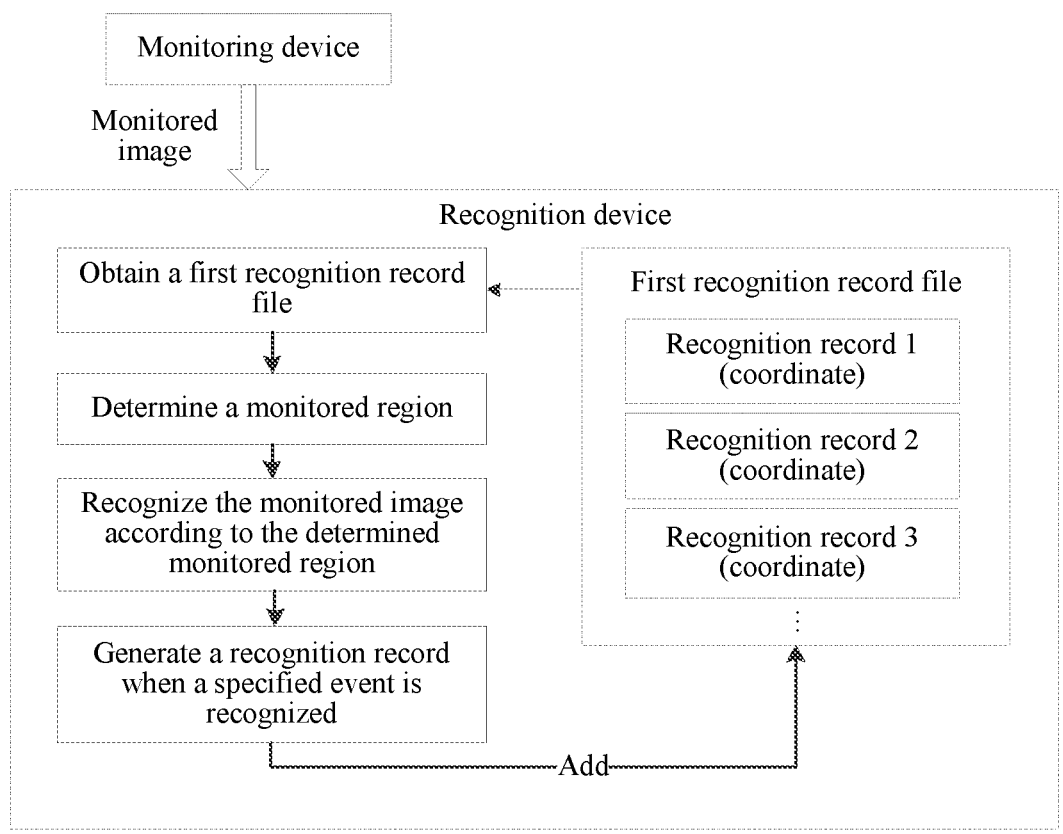
FIG. 5 is a flowchart of implementing a solution used in the embodiment of FIG. 2.

Specifically, FIG. 5 is a flowchart of implementing the solution according to this embodiment of this application. It is assumed that the monitoring device is a monitoring camera, and the recognition device is a monitoring server in a monitoring room. As shown in FIG. 5, the monitoring camera sends a recorded and monitored video to the monitoring server after being mounted. The monitoring server recognizes, during initiation, all regions in the monitored video sent by the monitoring camera, aggregates and displays a recognition result and the monitored video on a monitoring screen (that is, the graphic display device 160 shown in FIG. 1) when recognizing the specified event, generates a recognition record that includes a corresponding coordinate of the specified event in the monitored video, and adds the recognition record to the first recognition record file. The monitoring server obtains the first recognition record file every other day subsequently, determines a monitored region according to the recognition record in the obtained first recognition record file, recognizes, in a subsequent day according to the determined monitored region, a monitored video recorded by the monitoring camera (that is, recognizes only a part of image corresponding to the monitored region in the monitored video), generates, when recognizing the specified event, a recognition record that includes a corresponding coordinate of the specified event in the monitored video, and adds the recognition record to the first recognition record file.

In conclusion, according to the method shown in this embodiment of this application, the recognition device analyzes the coordinate of the recognized specified event included in the recognition record of the monitored video recorded by the monitoring device, to determine the monitored region that needs to be subsequently recognized, so that only the determined monitored region needs to be recognized during recognition of a monitored video subsequently recorded by the monitoring device. This can reduce a to-be-recognized image area, and reduce a calculation amount of the image recognition, thereby lowering a hardware requirement on a monitoring system and reducing power consumption.

In addition, according to the solution shown in this embodiment of this application, when recognizing, according to the determined monitored region, the monitored video subsequently recorded by the monitoring device, if a probability that a recognized event is the specified event is higher than the preset probability threshold, the recognition device generates a recognition record according to a coordinate corresponding to the recognized event and adds the recognition record to the first recognition record file, to supplement the first recognition record file in time. In this way, when subsequently determining a new monitored region, the recognition device may modify the monitored region according to the added recognition record, thereby improving accuracy of the determined monitored region.

Figure 6:
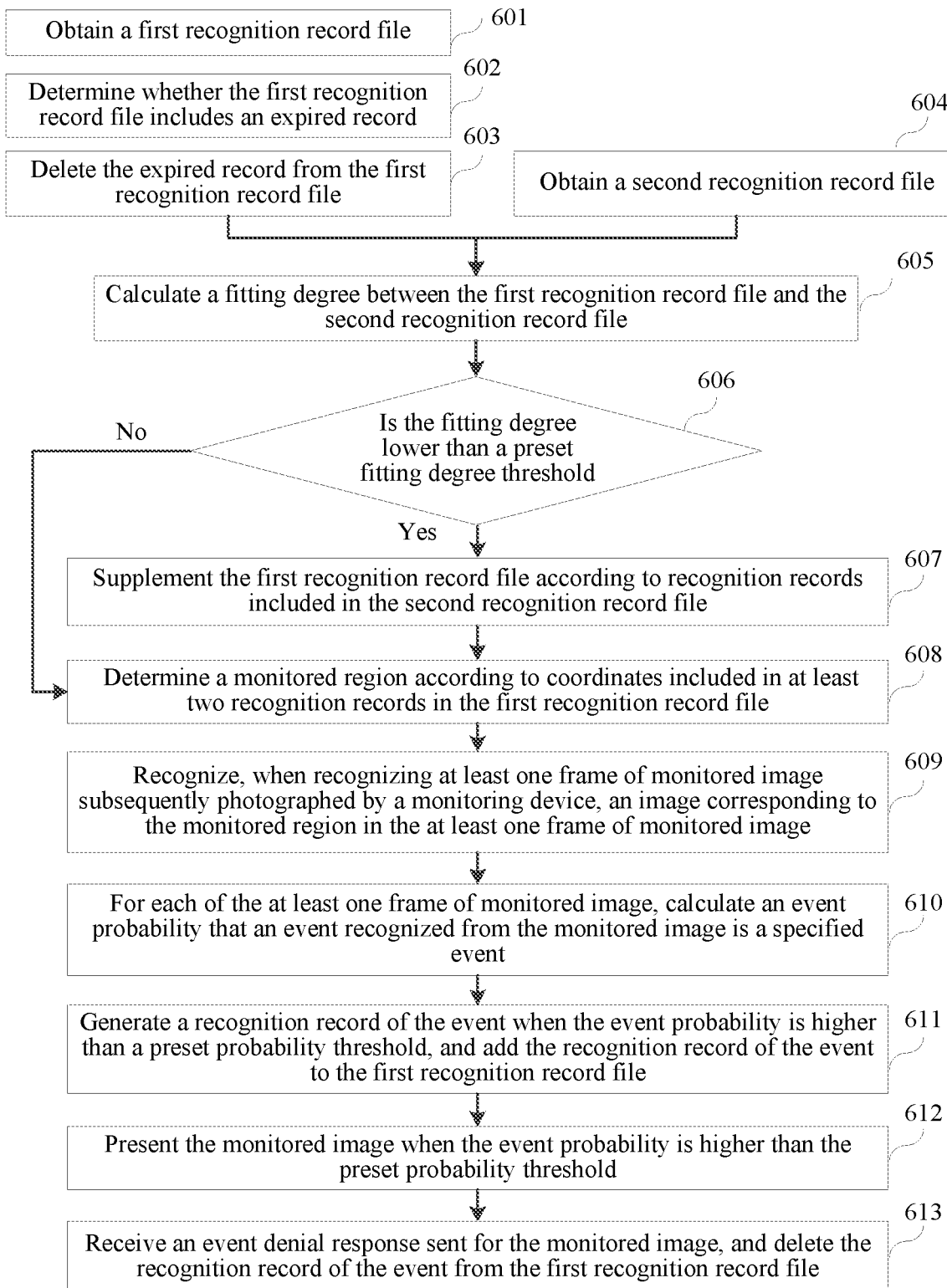
FIG. 6 is a flowchart of an image recognition method according to an exemplary embodiment.

FIG. 6 is a flowchart of an image recognition method according to an exemplary embodiment. The method may be applied to the recognition device 140 in the monitoring system shown in FIG. 1. The image recognition method may include the following steps:

Step 601: Obtain a first recognition record file, the first recognition record file including at least two recognition records, each recognition record including a corresponding coordinate of a specified event in a monitored video recorded by a monitoring device, and the specified event being recognized from the monitored video.

Step 602: Determine whether the first recognition record file includes an expired record.

In addition to a corresponding coordinate, each recognition record in the first recognition record file may further include corresponding recognition time, and the expired record is a record that an interval between the corresponding recognition time and current time is greater than a preset time interval.

During actual application, as time elapses, a region in which the recognized specified event is centralized may change. For example, a photographing direction of the monitoring device may change as time elapses, leading to a change of the region in which the coordinate corresponding to the specified event is centralized. In addition, as time elapses, there are an increasing quantity of recognition records in the first recognition record file, and an excessive quantity of recognition records may cause calculation for determining a subsequent monitored region to be more complex. Therefore, to avoid that a subsequently determined monitored region is inaccurate and calculation for determining the monitored region is too complex because a region in which the recognized specified event is centralized may change, in this embodiment of this application, after obtaining the first recognition record file, the monitoring device may calculate an interval between recognition time corresponding to each recognition record in the first recognition record file and current time, and determine a recognition record whose interval between the recognition time and the current time is greater than the preset time interval (for example, three months or half a year) as the expired record.

Step 603: Delete the expired record from the first recognition record file.

After determining the expired record in the first recognition record file, the recognition device may delete the expired record from the first recognition record file, to avoid that a subsequently determined monitored region is inaccurate and calculation for determining the monitored region is too complex because a region in which the recognized specified event is centralized may change.

Optionally, in the solution in this embodiment of this application, the recognition device may further recognize all regions in some of monitored videos recorded by the monitoring device, and supplement the first recognition record file according to a recognition result. Correspondingly, this embodiment of this application may further include the following steps 604 to 607.

Step 604: Obtain a second recognition record file, each recognition record in the second recognition record file including corresponding coordinates of the specified event in some monitored videos recorded by the monitoring device, the specified event being recognized from all regions in the some monitored videos.

The some monitored videos are images other than the monitored videos corresponding to the recognition records in the first recognition record file.

During actual application, not all specified events occur in a monitored region determined by the recognition device. In other words, a specified event may occur in a region other than the monitored region in the monitored video recorded by the monitoring device. To avoid that some specified events are missed to be recognized because the recognition device recognizes only the monitored region in the monitored video, in this embodiment of this application, the recognition device may extract some monitored videos from all monitored videos recorded by the monitoring device, recognize all regions in the some monitored videos, generate, when recognizing a specified event, a recognition record according to a corresponding coordinate of the recognized specified event in the monitored video, and add the recognition record to the second recognition record file.

In a possible implementation, when recognizing monitored videos recorded by the monitoring device, the recognition device may extract a particular percentage (for example, 10%) of the monitored videos from all the monitored videos recorded by the monitoring device, recognize all regions in the extracted monitored videos, and recognize the remaining monitored videos according to the determined monitored region.

When extracting a particular percentage of the monitored videos, the recognition device may extract the particular percentage of the monitored videos from all the monitored videos according to a random algorithm. Alternatively, the recognition device may sample all the monitored videos according to a pre-determined sampling rate, to extract the particular percentage of the monitored videos. Specifically, for example, assuming that the foregoing extraction percentage is 10%, and the monitoring device photographs and sends 100 frames of monitored videos, the recognition device may randomly extract 10 frames of monitored videos from the 100 frames of monitored videos, to recognize all regions in the extracted frames of monitored videos, and recognize the other 90 frames of monitored videos according to the determined monitored region. Alternatively, the monitoring device may sort the 100 frames of monitored videos according to a chronological photographing order of the 100 frames of monitored videos, and extract the last frame (or the second frame, the third frame, and the like) of every 10 frames of monitored videos, recognize all regions in the extracted monitored videos, and recognize the first nine frames of monitored videos of every 10 frames of monitored videos according to the determined monitored region.

Step 605: Calculate a fitting degree between the first recognition record file and the second recognition record file.

The fitting degree is used for indicating a similarity level between a first region and a second region. The first region is a region corresponding to the coordinates included in the recognition records in the first recognition record file, and the second region is a region corresponding to the coordinates included in the recognition records in the second recognition record.

Specifically, in this embodiment of this application, when calculating the fitting degree between the first recognition record file and the second recognition record file, the recognition device may first determine the first region corresponding to the coordinates included in the recognition records in the first recognition record file, and the second region corresponding to the coordinates included in the recognition records in the second recognition record file. Manners of determining the first region and the second region are similar to the operation of determining the monitored region in step 202. The recognition device calculates a ratio of an area of a common region between the second region and the first region to a total area of the second region, and calculates the foregoing fitting degree according to the ratio of the area of the common region to the total area of the second region. For example, the recognition device may directly use the ratio of the area of the common region to the total area of the second region as the fitting degree between the coordinates included in the recognition records in the first recognition record file and the coordinates included in the recognition records in the second recognition record file.

Figure 7:
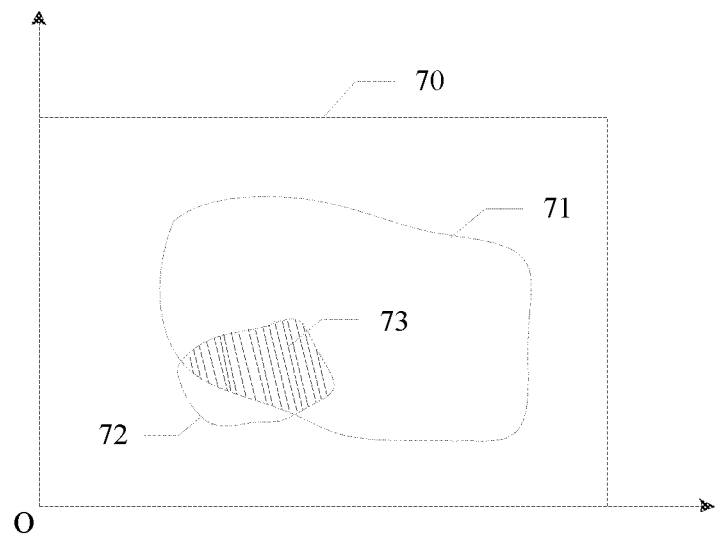
FIG. 7 is a schematic diagram of a region used in the embodiment of FIG. 6;.

For example, FIG. 7 is a schematic diagram of a region according to this embodiment of this application. As shown in FIG. 7, a region 70 is a complete coordinate region of the monitored video, and the recognition device calculates that the first region corresponding to the coordinates included in the recognition records in the first recognition record file is a region 71 and the second region corresponding to the coordinates included in the recognition records in the second recognition record file is a region 72. A common region between the region 71 and the region 72 is a region 73 (that is, a slanting line part in FIG. 7), so that the recognition device may calculate a ratio of an area of the region 73 to an area of the region 72, and use a calculation result as the fitting degree between the coordinates included in the recognition records in the first recognition record file and the coordinates included in the recognition records in the second recognition record file.

Optionally, each recognition record in the second recognition record file may further include corresponding recognition time. Before calculating the coordinates included in the recognition records in the first recognition record file and the coordinates included in the recognition records in the second recognition record file, the recognition device may further determine an expired record in the second recognition record file, and delete the expired record from the second recognition record file.

Step 606: Detect whether the fitting degree is lower than a preset fitting degree threshold; and if the fitting degree is lower than the preset fitting degree threshold, perform step 607; otherwise, perform step 608.

The fitting degree threshold may be a percentage preset or set according to an actual application requirement. For example, using an example in which the ratio of the area of the common region to the total area of the second region is the foregoing fitting degree, when the ratio of the area of the common region to the total area of the second region is not less than the preset fitting degree threshold (for example, 98%), it may be considered that a probability that the specified event occurs in a region other than the monitored region in the monitored video recorded by the monitoring device is relatively low. In this case, step 608 may be performed. On the contrary, if the ratio of the area of the common region to the total area of the second region is less than the preset fitting degree threshold, it may be considered that a probability that the specified event occurs in a region other than the monitored region in the monitored video recorded by the monitoring device is relatively high. In this case, step 607 may be performed before step 608.

Step 607: Supplement the first recognition record file according to the recognition records included in the second recognition record file.

In this embodiment of this application, when the fitting degree between the coordinates included in the recognition records in the first recognition record file and the coordinates included in the recognition records in the second recognition record file is lower than the preset fitting degree threshold, the recognition device may supplement the first recognition record file, to modify the monitored region in time. Specifically, when supplementing the first recognition record file, the recognition device may add all the recognition records in the second recognition record file to the first recognition record file. Alternatively, the recognition device may add only a recognition record, in which a corresponding coordinate is located out of the foregoing common region, in recognition records in the second recognition record file, to the first recognition record file.

In another possible implementation, the interval between the recognition time corresponding to the recognition records in the second recognition record file and current time is within a preset time interval (for example, within a week or a month). When determining whether needing to add the recognition records in the second recognition record file to the first recognition record file, the recognition device may alternatively not calculate the fitting degree between the first recognition record file and the second recognition record file, but calculate, after determining the first region corresponding to the coordinates included in the recognition records in the first recognition record file, and the second region corresponding to the coordinates included in the recognition records in the second recognition record file, whether a quantity of coordinates that are located out of the first region and that are in the coordinates included in the recognition records in the second recognition record file is greater than a preset quantity threshold. If the quantity of coordinates that are located out of the first region and that are in the coordinates included in the recognition records in the second recognition record file is greater than the preset quantity threshold, the recognition device determines to add the recognition records in the second recognition record file to the first recognition record file, to modify the monitored region determined according to the first recognition record file. The quantity threshold may be preset by a developer or maintenance personnel.

Step 608: Determine a monitored region according to the coordinates included in the at least two recognition records in the first recognition record file.

Step 609: Recognize, when recognizing at least one frame of monitored video subsequently recorded by the monitoring device, an image corresponding to the monitored region in the at least one frame of monitored video.

Optionally, when recognizing a part of the subsequent monitored video according to the determined monitored region, the recognition device may further supplement the first recognition record file. Correspondingly, this embodiment of this application may further include the following steps 610 and 611.

Step 610: For each of the at least one frame of monitored video, calculate an event probability that an event recognized from the monitored video is the specified event.

Step 611: Generate a recognition record of the event according to a corresponding coordinate of the event in the monitored video when the event probability is higher than a preset probability threshold, and add the recognition record of the event to the first recognition record file For an implementation process of step 608 to step 611, refer to the description of step 202 to step 205 in the embodiment of FIG. 2, and details are not described herein again.

Optionally, in the solution in this embodiment of this application, after a recognition record of a recognized event is added to the first recognition record file, when a user determines that the recognized event is not the specified event, the user may further delete the corresponding recognition record from the first recognition record file. Correspondingly, this embodiment of this application may further include step 612 and step 613.

Step 612: Present the monitored video when the event probability is higher than the preset probability threshold.

In this embodiment of this application, when the recognition device detects that an event probability of an event is higher than the preset probability threshold, it may be considered that the detected event may be the specified event. In this case, the monitored video corresponding to the recognized event may be presented, and the user or the monitoring personnel determines whether the specified event actually occurs.

Step 613: Receive an event denial response sent for the monitored video, the event denial response being used for indicating that the event is not the specified event; and delete the recognition record of the event from the first recognition record file.

When determining, according to the presented monitored video, that the specified event does not occur, the user or the monitoring personnel may send an event denial response based on the presented monitored video. In this case, the recognition device deletes the recognition record of the event from the first recognition record file, to prevent an incorrect recognition result from affecting accuracy of a subsequently determined monitored region.

Specifically, it is assumed that the monitoring device is a monitoring camera, and the recognition device is a monitoring server in a monitoring room. The monitoring camera sends a recorded and monitored video to the monitoring server after being mounted.

In the first day after the monitoring camera is mounted, the monitoring server recognizes, for the first time, all regions in a monitored video sent by the monitoring camera. When recognizing a specified event, the monitoring server aggregates and displays a recognition result and the monitored video on a monitoring screen, generates a recognition record that includes a corresponding coordinate of the specified event in the monitored video and recognition time, and adds the recognition record to the first recognition record file.

In the second day after the monitoring camera is mounted, the monitoring server obtains the first recognition record file, and determines a monitored region according to the recognition record in the obtained first recognition record file. For every 10 frames of monitored videos recorded by the monitoring camera, the recognition device recognizes the first nine frames of monitored videos according to the determined monitored region, and recognizes all regions in the last frame of monitored video. After recognizing the first nine frames of monitored videos and recognizing the specified event, the recognition device generates a recognition record that includes a coordinate of the specified event and recognition time, and adds the recognition record to the first recognition record file. After recognizing the last frame of monitored video and recognizing the specified event, the recognition device generates a recognition record that includes a coordinate of the specified event and recognition time, and adds the recognition record to the second recognition record file.

The monitoring server obtains the first recognition record file and the second recognition record file every other day subsequently. The monitoring server first deletes expired records from the first recognition record file and the second recognition record file according to recognition time, and then calculates a fitting degree between the coordinates included in the recognition records in the first recognition record file and the coordinates included in the recognition records in the second recognition record file. When the fitting degree between the coordinates included in the recognition records in the first recognition record file and the coordinates included in the recognition records in the second recognition record file is not less than the preset fitting degree threshold, the recognition device determines a monitored region according to the recognition records in the obtained first recognition record file. When the fitting degree between the coordinates included in the recognition records in the first recognition record file and the coordinates included in the recognition records in the second recognition record file is less than the preset fitting degree threshold, the recognition device adds the recognition records in the second recognition record file to the first recognition record file, and determines the monitored region according to the first recognition record file to which the recognition record is added. After determining the monitored region, for every 10 frames of monitored videos recorded by the monitoring camera, the recognition device recognizes the first nine frames of monitored videos according to the determined monitored region, and recognizes all regions in the last frame of monitored video. After recognizing the first nine frames of monitored videos and recognizing the specified event, the recognition device generates a recognition record that includes a coordinate of the specified event, and adds the recognition record to the first recognition record file. After recognizing the last frame of monitored video and recognizing the specified event, the recognition device generates a recognition record that includes a coordinate of the specified event, and adds the recognition record to the second recognition record file.

In conclusion, according to the method shown in this embodiment of this application, the recognition device analyzes the coordinate of the recognized specified event included in the recognition record of the monitored video recorded by the monitoring device, to determine the monitored region that needs to be subsequently recognized, so that only the determined monitored region needs to be recognized during recognition of a monitored video subsequently recorded by the monitoring device. This can reduce a to-be-recognized image area, and reduce a calculation amount of the image recognition, thereby lowering a hardware requirement on a monitoring system and reducing power consumption.

In addition, according to the solution shown in this embodiment of this application, when recognizing, according to the determined monitored region, the monitored video subsequently recorded by the monitoring device, if a probability that a recognized event is the specified event is higher than the preset threshold, the recognition device generates a recognition record according to a coordinate corresponding to the recognized event and adds the recognition record to the first recognition record file, to supplement the first recognition record file in time. In this way, when subsequently determining a new monitored region, the recognition device may modify the monitored region according to the added recognition record, thereby improving accuracy of the determined monitored region.

In addition, according to the method shown in this embodiment of this application, before determining the monitored region according to the first recognition record file, the recognition device first deletes the expired record from the first recognition record file, to avoid that a subsequently determined monitored region is inaccurate and calculation for determining the monitored region is too complex because a region in which the recognized specified event is centralized may change.

In addition, according to the method shown in this embodiment of this application, before determining the monitored region according to the first recognition record file, the recognition device further calculates the fitting degree between the first recognition record file and the second recognition record file, and supplements the first recognition record file according to the recognition records in the second recognition record file when the fitting degree is lower than the fitting degree threshold, to modify the monitored region determined according to the first recognition record file, thereby improving accuracy of the determined monitored region.

Figure 8:
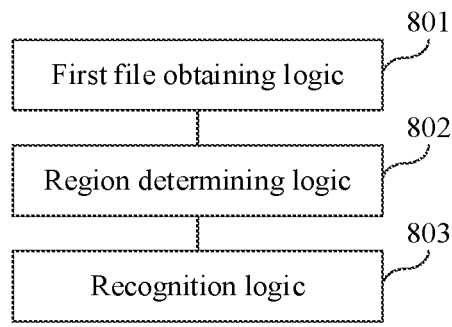
FIG. 8 is a structural block diagram of an image recognition apparatus according to an exemplary embodiment.

FIG. 8 is a structural block diagram of an image recognition apparatus according to an exemplary embodiment. The image recognition apparatus may be applied to the monitoring device 120 disposed in the monitoring system shown in FIG. 1, to perform all or some steps in the embodiment shown in FIG. 2 or FIG. 6. The image recognition apparatus may include:

a first file obtaining logic 801, configured to obtain a first recognition record file, the first recognition record file including at least two recognition records, each recognition record including a corresponding coordinate of a specified event in a monitored video recorded by a monitoring device, and the specified event being recognized from the monitored video;

a region determining logic 802, configured to determine a monitored region according to the coordinates included in the at least two recognition records in the first recognition record file, the monitored region being a part of region of the monitored video recorded by the monitoring device; and a recognition logic 803, configured to recognize, when recognizing at least one frame of monitored video subsequently recorded by the monitoring device, an image corresponding to the monitored region in the at least one frame of monitored video.

Optionally, the region determining logic includes:

a coordinate determining unit, configured to determine a target coordinate in the coordinates included in the at least two recognition records in the first recognition record file, the target coordinate being a coordinate whose confidence level is higher than a preset confidence level threshold, and the confidence level being used for indicating a probability of recognizing the specified event again at the corresponding coordinate; and a region determining unit, configured to determine a smallest region including the target coordinate as the monitored region.

Optionally, the coordinate determining unit includes:

a calculation subunit, configured to calculate a standard deviation of the coordinates included in the at least two recognition records in the first recognition record file;

a generation subunit, configured to generate, according to the standard deviation, a two-dimensional normal distribution formula corresponding to the coordinates included in the at least two recognition records in the first recognition record file; and a coordinate determining subunit, configured to determine, according to the two-dimensional normal distribution formula and the confidence level threshold, a coordinate whose confidence level is higher than the confidence level threshold in the coordinates included in the at least two recognition records in the first recognition record file as the target coordinate.

Optionally, the apparatus further includes:

a probability calculation logic, configured to: for each of the at least one frame of monitored video, calculate an event probability that an event recognized from the monitored video is the specified event;

a record generation logic, configured to generate a recognition record of the event according to a corresponding coordinate of the event in the monitored video when the event probability is higher than a preset probability threshold; and an adding logic, configured to add the recognition record of the event to the first recognition record file.

Optionally, the apparatus further includes:

a presentation logic, configured to present the monitored video when the event probability is higher than the preset probability threshold;

a response receiving logic, configured to receive an event denial response sent for the monitored video, the event denial response being used for indicating that the event is not the specified event; and a first deletion logic, configured to delete the recognition record of the event from the first recognition record file.

Optionally, each recognition record further includes corresponding recognition time, and the apparatus further includes:

a record determining logic, configured to determine whether the first recognition record file includes an expired record before the monitored region is determined according to the coordinates included in the at least two recognition records in the first recognition record file, the expired record being a record that an interval between the corresponding recognition time and current time is greater than a preset time interval; and a second deletion logic, configured to delete the expired record from the first recognition record file.

Optionally, the apparatus further includes:

a second file obtaining logic, configured to obtain a second recognition record file before the region determining logic determines the monitored region according to the coordinates included in the at least two recognition records in the first recognition record file, each recognition record in the second recognition record file including corresponding coordinates of the specified event in some monitored videos recorded by the monitoring device, the specified event being recognized from all regions in the some monitored videos, and the some monitored videos being images other than the monitored videos corresponding to the recognition records in the first recognition record file;

a fitting degree calculation logic, configured to calculate a fitting degree between the coordinates included in the recognition records in the first recognition record file and the coordinates included in the recognition records in the second recognition record file, the fitting degree being used for indicating a similarity level between a first region and a second region, the first region being a region corresponding to the coordinates included in the recognition records in the first recognition record file, and the second region being a region corresponding to the coordinates included in the recognition records in the second recognition record; and a supplement logic, configured to: supplement the first recognition record file according to the recognition records included in the second recognition record file when the fitting degree is lower than a preset fitting degree threshold.

In conclusion, according to the apparatus shown in this embodiment of this application, the recognition device analyzes the coordinate of the recognized specified event included in the recognition record of the monitored video recorded by the monitoring device, to determine the monitored region that needs to be subsequently recognized, so that only the determined monitored region needs to be recognized during recognition of a monitored video subsequently recorded by the monitoring device. This can reduce a to-be-recognized image area, and reduce a calculation amount of the image recognition, thereby lowering a hardware requirement on a monitoring system and reducing power consumption.

In addition, according to the apparatus shown in this embodiment of this application, when recognizing, according to the determined monitored region, the monitored video subsequently recorded by the monitoring device, if a probability that a recognized event is the specified event is higher than the preset threshold, the recognition device generates a recognition record according to a coordinate corresponding to the recognized event and adds the recognition record to the first recognition record file, to supplement the first recognition record file in time. In this way, when subsequently determining a new monitored region, the recognition device may modify the monitored region according to the added recognition record, thereby improving accuracy of the determined monitored region.

In addition, according to the apparatus shown in this embodiment of this application, before determining the monitored region according to the first recognition record file, the recognition device first deletes the expired record from the first recognition record file, to avoid that a subsequently determined monitored region is inaccurate and calculation for determining the monitored region is too complex because a region in which the recognized specified event is centralized may change.

In addition, according to the apparatus shown in this embodiment of this application, before determining the monitored region according to the first recognition record file, the recognition device further calculates the fitting degree between the first recognition record file and the second recognition record file, and supplements the first recognition record file according to the recognition records in the second recognition record file when the fitting degree is lower than the fitting degree threshold, to modify the monitored region determined according to the first recognition record file, thereby improving accuracy of the determined monitored region.

Figure 9:
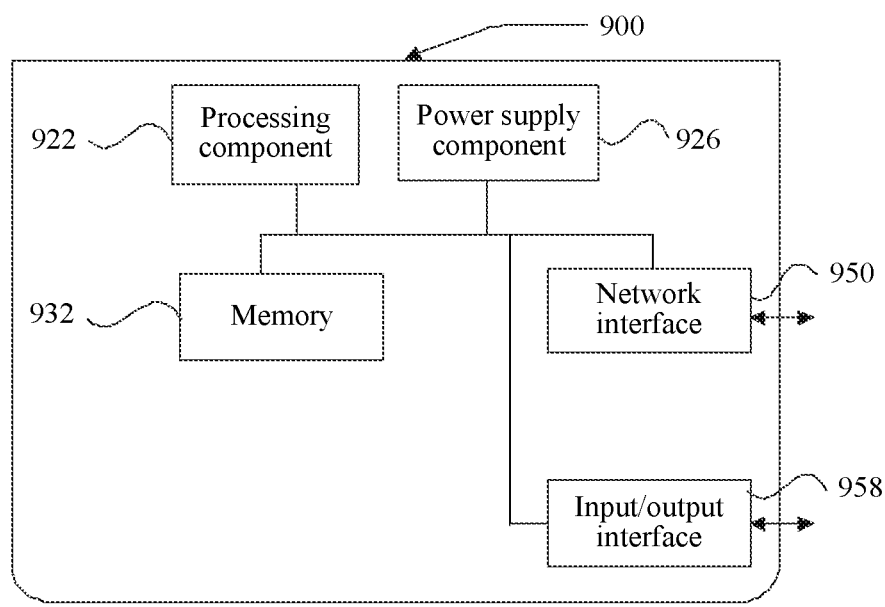
FIG. 9 is a schematic structural diagram of a device according to an exemplary embodiment.

FIG. 9 is a schematic structural diagram of a device 900 according to an exemplary embodiment. For example, the device 900 may be the recognition device 140 in the monitoring system shown in FIG. 1. Referring to FIG. 9, the device 900 includes: a processing component 922, the processing component 922 further including one or more processors, and a memory resource represented by a memory 932, the memory resource being used for storing instructions, for example, an application, that can be executed by the processing component 922. The application stored in the memory 932 may include one or more logical components, each of which corresponding to a set of instructions. In addition, the processing component 922 is configured to execute the instructions, to implement the foregoing image recognition method performed by the recognition device.

The device 900 may further include: a power supply component 926, configured to manage power supply of the device 900, a wired or wireless network interface 950, configured to connect the device 900 to a network, and an input/output (I/O) interface 958. The device 900 may operate an operating system stored in the memory 932, for example, WINDOWS SERVER, MAC OS X, UNIX, LINUX, or FREEBSD.

In an exemplary embodiment, a non-transitory computer readable storage medium including an instruction, for example, a memory including an instruction, is further provided, and the foregoing instruction may be executed by a processor in a recognition device to complete the method in FIG. 2 or FIG. 6 in the embodiments of this application. For example, the non-transitory computer readable storage medium may be a read-only memory (ROM), a random access memory (RAM), a CD-ROM, a magnetic tape, a floppy disk, an optical data storage device, or the like.

Examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof. The processor may be one or more devices operable to execute logic. The logic may include computer executable instructions or computer code stored in the memory or in other memory that when executed by the processor, cause the processor to perform the features implemented by the logic of units, subunits, and/or logic described herein. The computer code may include instructions executable with the processor.

The memory 101 may be any device for storing and retrieving data or any combination thereof. The memory may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device. In some examples, the memory may include a non-transitory computer-readable storage medium includes a floppy disk, a hard disk, a magneto-optical disk, an optical memory, a magnetic tape, a non-volatile storage card, and a ROM. Optionally, program code may be downloaded form a server computer through a communications network.

The system and methods described herein may be implemented in many ways. All or some of the processes of the methods in the embodiments may be implemented by a computer program instructing relevant hardware. The instructions may be stored in a computer readable storage medium. For example, in the embodiments of the present disclosure, the instructions may be stored in a storage medium of a computer system, and executed by at least one processor in the computer system, to implement the processes of the embodiments of the foregoing methods. The foregoing storage medium may be a magnetic disk, an optical disc, a read-only memory (ROM), or a random access memory (RAM). Alternatively or in addition, the units, subunits, controllers, and/or logic described herein may be referred to as a logical component(s). Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A content recognition method comprising:
   obtaining, by a recognition device, a first recognition record file, the first recognition record file comprising a plurality of recognition records, the recognition records comprising respective coordinates for a monitored video received by a monitoring device, the respective coordinates indicative of a specified event previously recognized based on the monitored video;
   determining, by the recognition device, a monitoring boundary based on the respective coordinates of the recognition records for the monitored video received by the monitoring device;
   receiving, by the recognition device, at least one frame of subsequent monitored video; and
   extracting, by the recognition device, in response to receipt of the at least one frame of the subsequent monitored video, image data from the at least one frame of the subsequent monitored video, the image data from the at least one frame being located in the monitoring boundary as applied to the at least one frame of the subsequent monitored video.

2. The method of claim 1, wherein determining, by the recognition device, the monitoring boundary based on the respective coordinates of the recognition records for the monitored video received by the monitoring device further comprises:
   determining, by the recognition device, a target coordinate from the respective coordinates in response to, the target coordinate being associated with a confidence level that is greater than a preset confidence level threshold, wherein the confidence level includes a probability of recognizing the specified event at the target coordinate; and
   determining, by the recognition device, a smallest region that includes the target coordinate as the monitoring boundary.

3. The method of claim 2, wherein the determining, by the recognition device, the target coordinate from the respective coordinates further comprises:
   calculating, by the recognition device, a standard deviation of the respective coordinates included in the recognition records in the first recognition record file;
   generating, by the recognition device based on the standard deviation, a two-dimensional normal distribution model corresponding to the respective coordinates included in the recognition records in the first recognition record file; and
   determining, by the recognition device, based on to the two-dimensional normal distribution model and the preset confidence level threshold, the target coordinate.

4. The method of claim 1, further comprising:
   for each of the at least one frame of the subsequent monitored video, generating, by the recognition device, an event probability that an event recognized from the subsequent monitored video corresponds to the specified event;
   generating, by the recognition device, in response to the event probability being greater than a preset probability threshold, a recognition record of the event, the recognition record comprising a coordinate of the event in the subsequent monitored video; and including, by the recognition device, the generated recognition record of the event to the first recognition record file.

5. The method of claim 4, further comprising:
presenting, by the recognition device, the subsequent monitored video in response to the event probability being greater than the preset probability threshold;
receiving, by the recognition device, an event denial response sent for the subsequent monitored video, the event denial response being indicative of the event not corresponding to specified event; and
deleting, by the recognition device, the generated recognition record of the event from the first recognition record file.

6. The method of claim 1, wherein each of the recognition records further comprise a corresponding recognition time, wherein before determining, by the recognition device, the monitoring boundary based on the respective coordinates of the recognition records for the monitored video received by the monitoring device, the method further comprises:
determining, by the recognition device, the first recognition record file includes an expired record, the expired record comprising at least one of the recognition records with where an interval after the corresponding recognition time is greater than a preset time interval; and
deleting, by the recognition device, the expired record from the first recognition record file.

7. The method of claim 1, wherein the monitored video comprises a first monitored video, wherein before determining, by the recognition device, the monitoring boundary based on the respective coordinates of the recognition records for the monitored video received by the monitoring device, the method further comprises:
obtaining, by the recognition device, a second recognition record file, each recognition record of the second recognition record file comprising respective coordinates for the specified event in a second monitored video received by the monitoring device, the specified event being recognized from all regions in the second monitored video, and the second monitored video being different from the first monitored video;
calculating, by the recognition device, a fitting degree between the first recognition record file and the second recognition record file, the fitting degree indicative of a similarity level between a first region and a second region, the first region corresponding to the respective coordinates include in the recognition records of the first recognition record file, and the second region corresponding to the respective coordinates included in the recognition records of the second recognition record file; and
supplementing, by the recognition device, the first recognition record file with the recognition records included in the second recognition record file in response to the fitting degree being less than a preset fitting degree threshold.

8. A content recognition system comprising:
a processor, the processor configured to:
obtain a first recognition record file, the first recognition record file comprising a plurality of recognition records, the recognition records comprising respective coordinates for a monitored video received by a monitoring device, the respective coordinates indicative of a specified event previously recognized based on the monitored video;
determine a monitoring boundary based on the respective coordinates of the recognition records for the monitored video received by the monitoring device;
receive at least one frame of subsequent monitored video; and
extract in response to receipt of the at least one frame of the subsequent monitored video, image data from the at least one frame of the subsequent monitored video, the image data from the at least one frame being located in the monitoring boundary as applied to the at least one frame of the subsequent monitored video.

9. The system of claim 8, wherein to determine the monitoring boundary based on the respective coordinates of the recognition records for the monitored video received by the monitoring device, the processor is further configured to:
determine a target coordinate from the respective coordinates in response to, the target coordinate being associated with a confidence level that is greater than a preset confidence level threshold, wherein the confidence level includes a probability of recognizing the specified event at the target coordinate; and
determine a smallest region that includes the target coordinate as the monitoring boundary.

10. The system of claim 9, wherein to determine the target coordinate from the respective coordinates, the processor is further configured to:
calculate, by the recognition device, a standard deviation of the respective coordinates included in the recognition records in the first recognition record file;
generate, by the recognition device based on the standard deviation, a two-dimensional normal distribution model corresponding to the respective coordinates included in the recognition records in the first recognition record file; and
determine, by the recognition device, based on to the two-dimensional normal distribution model and the preset confidence level threshold, the target coordinate.

11. The system of claim 8, wherein the processor is further configured to:
generate, for each of the at least one frame of the subsequent monitored video, an event probability that an event recognized from the subsequent monitored video corresponds to the specified event;
generate, in response to the event probability being greater than a preset probability threshold, a recognition record of the event, the recognition record comprising a coordinate of the event in the subsequent monitored video; and
include the generated recognition record of the event to the first recognition record file.

12. The system of claim 11, wherein the processor is further configured to:
present the subsequent monitored video in response to the event probability being greater than the preset probability threshold;
receive an event denial response sent for the subsequent monitored video, the event denial response being indicative of the event not corresponding to specified event; and
delete the generated recognition record of the event from the first recognition record file.

13. The system of claim 8, wherein each of the recognition records further comprise a corresponding recognition time, wherein before determining the monitoring boundary based on the respective coordinates of the recognition records for the monitored video received by the monitoring device, the processor is further configured to:
  determine the first recognition record file includes an expired record, the expired record comprising at least one of the recognition records with where an interval after the corresponding recognition time is greater than a preset time interval; and
  delete the expired record from the first recognition record file.

14. The system of claim 8, wherein the monitored video comprises a first monitored video, wherein before determining, by the recognition device, the monitoring boundary based on the respective coordinates of the recognition records for the monitored video received by the monitoring device, the processor is further configured to:
  obtain a second recognition record file, each recognition record of the second recognition record file comprising respective coordinates for the specified event in a second monitored video received by the monitoring device, the specified event being recognized from all regions in the second monitored video, and the second monitored video being different from the first monitored video;
  calculate a fitting degree between the first recognition record file and the second recognition record file, the fitting degree indicative of a similarity level between a first region and a second region, the first region corresponding to the respective coordinates include in the recognition records of the first recognition record file, and the second region corresponding to the respective coordinates included in the recognition records of the second recognition record file; and
  supplement the first recognition record file with the recognition records included in the second recognition record file in response to the fitting degree being less than a preset fitting degree threshold.

15. A non-transitory computer readable storage medium comprising:
  a plurality of instructions, the instructions executable by a processor to:
    obtain a first recognition record file, the first recognition record file comprising a plurality of recognition records, the recognition records comprising respective coordinates for a monitored video received by a monitoring device, the respective coordinates indicative of a specified event previously recognized based on the monitored video;
    determine a monitoring boundary based on the respective coordinates of the recognition records for the monitored video received by the monitoring device;
    receive at least one frame of subsequent monitored video; and
    extract in response to receipt of the at least one frame of the subsequent monitored video, image data from the at least one frame of the subsequent monitored video, the image data from the at least one frame being located in the monitoring boundary as applied to the at least one frame of the subsequent monitored video.

16. The non-transitory computer readable storage medium of claim 15, wherein the instructions executable by the processor to determine the monitoring boundary based on the respective coordinates of the recognition records for the monitored video received by the monitoring device are further executable by the processor to:
  determine a target coordinate from the respective coordinates in response to, the target coordinate being associated with a confidence level that is greater than a preset confidence level threshold, wherein the confidence level includes a probability of recognizing the specified event at the target coordinate; and
  determine a smallest region that includes the target coordinate as the monitoring boundary.

17. The non-transitory computer readable storage medium of claim 16, wherein the instructions executable by the processor to the target coordinate from the respective coordinates are further executable by the processor to:
  calculate, by the recognition device, a standard deviation of the respective coordinates included in the recognition records in the first recognition record file;
  generate, by the recognition device based on the standard deviation, a two-dimensional normal distribution model corresponding to the respective coordinates included in the recognition records in the first recognition record file; and
  determine, by the recognition device, based on to the two-dimensional normal distribution model and the preset confidence level threshold, the target coordinate.

18. The non-transitory computer readable storage medium of claim 15, wherein the instructions are further executable by the processor to:
  generate, for each of the at least one frame of the subsequent monitored video, an event probability that an event recognized from the subsequent monitored video corresponds to the specified event;
  generate, in response to the event probability being greater than a preset probability threshold, a recognition record of the event, the recognition record comprising a coordinate of the event in the subsequent monitored video; and
  include the generated recognition record of the event to the first recognition record file.

19. The non-transitory computer readable storage medium of claim 18, wherein the instructions are further executable by the processor to:
  present the subsequent monitored video in response to the event probability being greater than the preset probability threshold;
  receive an event denial response sent for the subsequent monitored video, the event denial response being indicative of the event not corresponding to specified event; and
  delete the generated recognition record of the event from the first recognition record file.

20. The non-transitory computer readable storage medium of claim 15, wherein each of the recognition records further comprise a corresponding recognition time, wherein the instructions are further executable by the processor to:
  determine the first recognition record file includes an expired record, the expired record comprising at least one of the recognition records with where an interval after the corresponding recognition time is greater than a preset time interval; and
  delete the expired record from the first recognition record file.

* * * * *